(12) United States Patent
Kekki et al.

(10) Patent No.: US 7,020,614 B2
(45) Date of Patent: Mar. 28, 2006

(54) BOOSTING OF DATA TRANSMISSION

(75) Inventors: Sami Kekki, Helsinki (FI); Jyri Suvanen, Helsinki (FI)

(73) Assignee: Nokia Corporation, Espoo (FI)

( * ) Notice: Subject to any disclaimer, the term of this patent is extended or adjusted under 35 U.S.C. 154(b) by 559 days.

(21) Appl. No.: 09/882,949

(22) Filed: Jun. 15, 2001

(65) Prior Publication Data

US 2002/0040294 A1 Apr. 4, 2002

Related U.S. Application Data

(63) Continuation of application No. PCT/FI99/01070, filed on Dec. 22, 1999.

(30) Foreign Application Priority Data

Dec. 23, 1998 (FI) .................................. 982796

(51) Int. Cl.
*G10L 19/00* (2006.01)
(52) U.S. Cl. .................................................. 704/500
(58) Field of Classification Search ......... 704/500–504
See application file for complete search history.

(56) References Cited

U.S. PATENT DOCUMENTS

| | | | |
|---|---|---|---|
| 5,430,774 A | 7/1995 | Dupuy | |
| 5,768,314 A | 6/1998 | Kapadia et al. | |
| 6,070,089 A * | 5/2000 | Brophy et al. | 455/560 |
| 6,104,993 A * | 8/2000 | Ashley | 704/227 |
| 6,172,974 B1 * | 1/2001 | Tseng et al. | 370/357 |

FOREIGN PATENT DOCUMENTS

| | | |
|---|---|---|
| WO | WO 96/00483 | 1/1996 |
| WO | WO 96/32823 | 10/1996 |
| WO | WO 97/29566 | 8/1997 |
| WO | WO 98/21841 | 5/1998 |

OTHER PUBLICATIONS

James L. Flanagan, "Speech analysis, Synthesis and Perception", 1972, Springer-Verlag, pp. 323-327.*
Digital Cellualr telecommunications sysem (Phase 2+); Adaptive Multi-Rate (AMR) speech transcoding GSM 06.90 version 7.2 Release 1998), ETSI EN 301 704, v7.2.1, Apr. 2000, pp. 1-58.*
Furui, Sadaoki, Digital Speech Processing, Synthesis, and Recognition, 1989 by Marcel Dekker, Inc., pp. 64-67, 133-137.*

* cited by examiner

*Primary Examiner*—David D. Knepper
(74) *Attorney, Agent, or Firm*—Squire, Sanders & Dempsey LLP

(57) ABSTRACT

The invention concerns a method for boosting data transmission in a telecommunications system and a mobile communications system. The invention is characterised in that the telecommunications network uses at least on a part of the transmission path between the fixed station, e.g. a base transceiver station, and the transcoder unit speech coding at a lower transmission rate than the transmission rate of the speech coding used on the transmission path between the fixed station and the terminal equipment. The speech parameters received from the terminal equipment are converted for the speech coding method used on the transmission connection between the fixed station and the transcoder unit and vice versa. In the network transcoder unit it is possible to reconvert speech parameters received from the direction of the terminal equipment e.g. into speech parameters of the speech coding used on the transmission path between the terminal equipment and the fixed station.

13 Claims, 7 Drawing Sheets

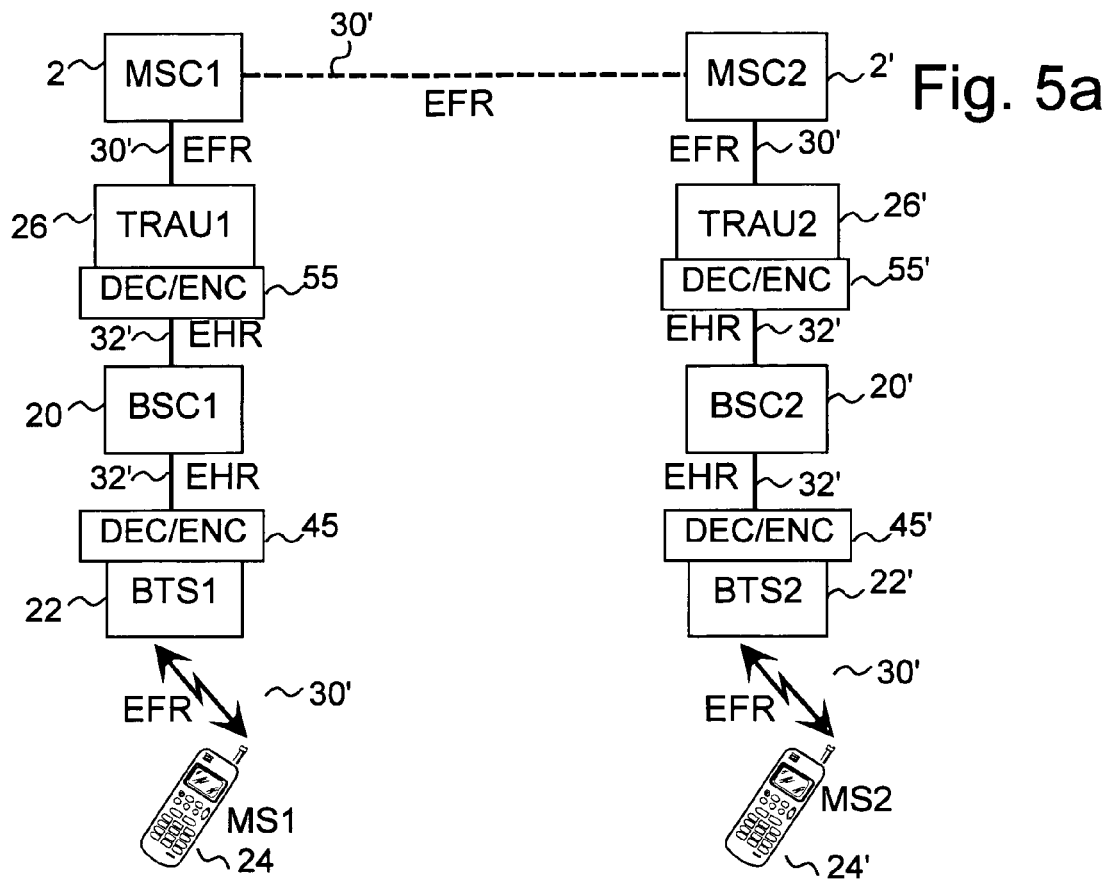
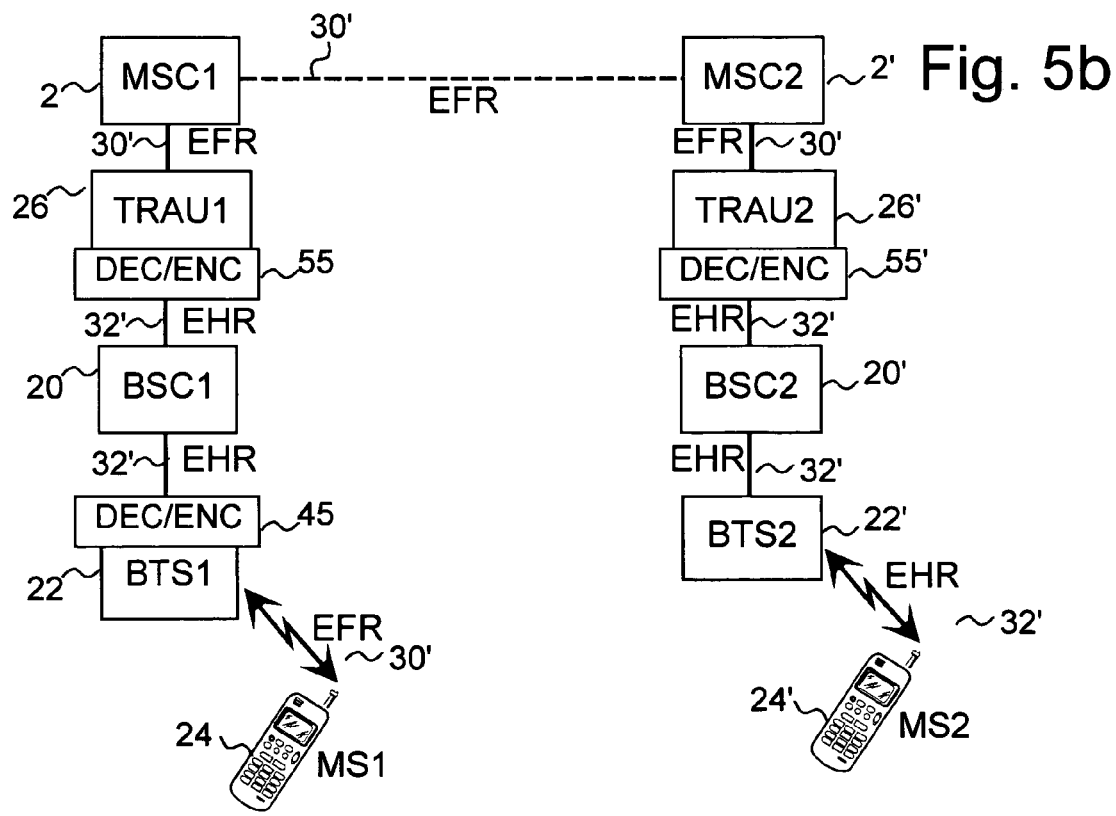

BOOSTING OF DATA TRANSMISSION

This application is a continuation of international application serial number PCT/FI99/01070, filed 22 Dec. 1999.

FIELD OF THE INVENTION

This invention concerns a method of boosting data transmission in a telecommunications network.

BACKGROUND OF THE INVENTION

In FIG. 1 of the appended drawing a simplified Global System for Mobile communications, a GSM system for short, is shown as a block diagram. The Network Subsystem, NSS, includes a mobile services switching centre MSC 2 which is connected to other mobile services switching centres, and directly or through a Gateway Mobile Services Switching Centre, a GMSC system interface the mobile network is connected to other networks, such as a Public Switched Telephone Network, PSTN 4, an Integrated Services Digital Network, ISDN 6, other Public Land Mobile Networks, PLMN 10, and packet switched public data networks, PSPDN 12, and circuit switched public data networks, CSPDN 14. In the mobile services switching centre MSC 2 there are Network Interworking Functions, IWF 16, for matching the GSM network with the other networks. Through an A-interface the NSS network subsystem is connected to a Base Station Subsystem, BSS, which includes base station controllers BSC 20, each one of which controls the base transceiver stations BTS 22 connected to them. The interface between the base station controller BSC and the base transceiver stations BTS connected to it is an A bis interface. The base transceiver stations BTS 22 for their part are connected over a radio path with mobile stations MS 24 across the radio interface. The operation of the whole system is monitored by an Operation and Maintenance Centre, OMC.

The mobile station MS 24 sends speech or user data across the radio interface on a radio channel at standard rates of e.g. 13 kbit's or 5.6 kbit/s. Speech coding is used in the speech transmission to achieve a lower transmission rate than typically in telephone networks, whereby the band width needed by the radio link on the radio path is reduced. The base transceiver station BTS 22 receives the data of the traffic channel and transmits it into the 64 kbit/s time slot of the PCM line. Into the same time slot, that is, channel, are also placed three other full-rate traffic channels of the same carrier wave, so the transmission rate per connection will be 16 kbit/s. For half-rate traffic channels the transmission rate is 8 kbit/s per connection. A transcoder/rate adapting unit TRAU 26 converts the coded 16 kbit/s or 8 kbit/s digital information to the 64 kbit/s channel, and on this channel the data is transmitted to an IWF 16 unit which is located in the mobile services switching centre MSC 2 and which performs the required modulation and rate conversion, whereupon the data is transmitted to some other network. Thus, the user data is transmitted over fixed connections in the uplink direction from base transceiver station BTS 22 to base station controller BSC 20 and to mobile services switching centre MSC 2 and, correspondingly, the data to be relayed to mobile station MS 24 is transmitted in the downlink direction from mobile services switching centre MSC 2 through base station controller BSC 20 to base transceiver station BTS 22 and from there further over the radio path to mobile station MS 24.

In the GSM system, a Channel Codec Unit, CCU, of the base transceiver station performs a conversion of the signal received on the radio channel to the PCM time slot channel of the trunk line running over the A bis interface and a conversion of the frame structure of the signal received over the A bis interface into a form which can be transmitted on the radio channel. The transcoder unit TRAU 26 performs the conversion operations on the signals to be transmitted across the A-interface. The transcoder/rate adapting unit TRAU 26 is often located far from the base transceiver station 22, e.g. in connection with the base station controller BSC 20.

In a digital mobile system, speech is generally coded into a digital form by using low rate speech coding. Nowadays the SM system uses Full Rate FR 30 coding at a transmission rate of 13 kbit/s, Half Rate HR 32 coding at a transmission rate of 5.6 kbit/s, Enhanced Full Rate EFR 30' coding at a transmission rate of 12.2 kbit/s and Enhanced Half Rate EHR 32' coding. The enhanced speech codings 30', 32' are so advanced that the quality of speech is not significantly reduced in them.

Thus, speech coding is performed in the mobile station and on the mobile network side in the transcoder unit TRAU 26. The speech information to be transmitted is one of the parameters of the speech coding method. In modern GSM systems the TRAU 26 transcoders are of several different types of coding, e.g. full rate, half rate or double acting, which is able to change from one rate to another. The transcoders convert the speech from a digital format into another, e.g. they convert 64 kbit/s A-law PCM arriving from the exchange over the A interface into 13 kbit/s full rate FR 30 coded speech for transmission to the base transceiver station line, and vice versa. In a call between two mobile stations PCM speech samples are transmitted from one transcoder to another, which codes them by a speech coding method which is used on the radio path. Repeated coding and decoding of the speech signal during the transmission will distort the speech signal, for which reason this coding-decoding chain, which is called tandem coding, is usually avoided.

The Finnish Patent Application FI-951807 presents transmission of speech frames, which have not been decoded, between transcoders and thus barring of tandem coding in the transcoder, when the call is one between two mobile stations, that is, a Mobile to Mobile Call, MMC. In the solution according to the application, the coded speech parameters are sent on the PCM time slot sub-channel without any decoding and coding in the TRAU transcoders of the mobile station network. Tandem coding is avoided by relaying with minor changes the frames coming from one base transceiver station BTS 22 through these tandem connected TRAU 26 transcoders to another base transceiver station BTS 22'. The receiving transcoder will perceive from these minor changes in the frame that coding need not be done, and it will relay further the received speech parameters of the frame as such.

The Finnish Patent Application FI-960590 presents a transmission adaptation for a connection between exchanges. In the solution according to the application, a speech signal is transmitted coded by a speech coding method on a sub-channel of a PCM channel. The speech coding for the connection between exchanges is chosen according to the speech coding of the TRAU frames of the A-interface, except if the speech coding of the TRAU frames received from the A-interface is different from the speech coding of TRAU frames received from other transmission equipment, that is, if the parties to the call are using different speech codings. FIGS. 2a–2c illustrate this adaptation of the transmission for a connection between exchanges in a few cases shown as examples. The speech coding used in each part of the transmission path is marked in the figures, in this example they are full rate FR 30 and half rate HR 32 speech coding. In FIG. 2a both mobile stations MS1 24 and MS2 24' use the full rate FR 30 speech coding method. Hereby the speech parameters are transmitted through the mobile station network as unchanged full rate speech parameters. In FIG. 2b both mobile stations MS1 and MS2 use a half rate HR 32 speech coding method. Hereby the speech parameters are transmitted through the mobile station network as half rate speech parameters. In the case shown in FIG. 2c, mobile station MS1 uses half rate HR speech coding while mobile station MS2 uses full rate FR 30 speech coding. In this situation, a change is made at the mobile services switching centre MSC1 end to full rate speech coding and the necessary decoding and speech coding are performed.

A problem with the presented transmission situations is the need of transmission capacity, especially on the transmission connection between the base transceiver station and the network transcoder. The transmission in the mobile station network of speech parameters of the mobile station using full rate speech codec requires a full rate channel, which cannot be transmitted, if on the transmission connection e.g. only a half of that transmission capacity is available, which is required by a full rate signal.

BRIEF SUMMARY OF THE INVENTION

The purpose of this invention is to boost data transmission especially in transmission connections on the network side of a mobile communications system.

This objective is achieved with the method and arrangement according to the invention, which are characterised by the features stated in the independent claims. Advantageous embodiments of the invention are presented in the dependent claims.

The invention is based on the idea that the data communications network uses at least in a part of the transmission path between a fixed station, e.g. a base transceiver station, and a transcoder unit a lower transmission rate speech coding than the transmission rate of the speech coding used on the transmission path between the fixed station and the terminal equipment. The speech parameters received from the terminal equipment are converted to the speech coding method used in the transmission connection between the fixed station and the transcoder unit, and vice versa. In the transcoder unit of the network it is possible to convert speech parameters received from the terminal equipment back to e.g. the speech parameters of the speech coding used on the transmission path between the terminal equipment and the fixed station.

It is an advantage of such boosting of data transmission that less transmission capacity is needed per speech connection at least in a part of the transmission connection between the base transceiver station and the transcoder unit of the network.

It is another advantage of the data communications system according to the invention that it allows trafficking between terminal equipment using different speech coding methods, at best with only one speech coding during the transmission.

LIST OF FIGURES

The invention will now be described in greater detail in connection with advantageous embodiments and referring to the examples in accordance with FIGS. 3–6b in the appended drawings, wherein:

FIGS. 5a and 5b show speech transmission situations according to another embodiment of the invention as examples.

DETAILED DESCRIPTION OF THE INVENTION

Figure 1:
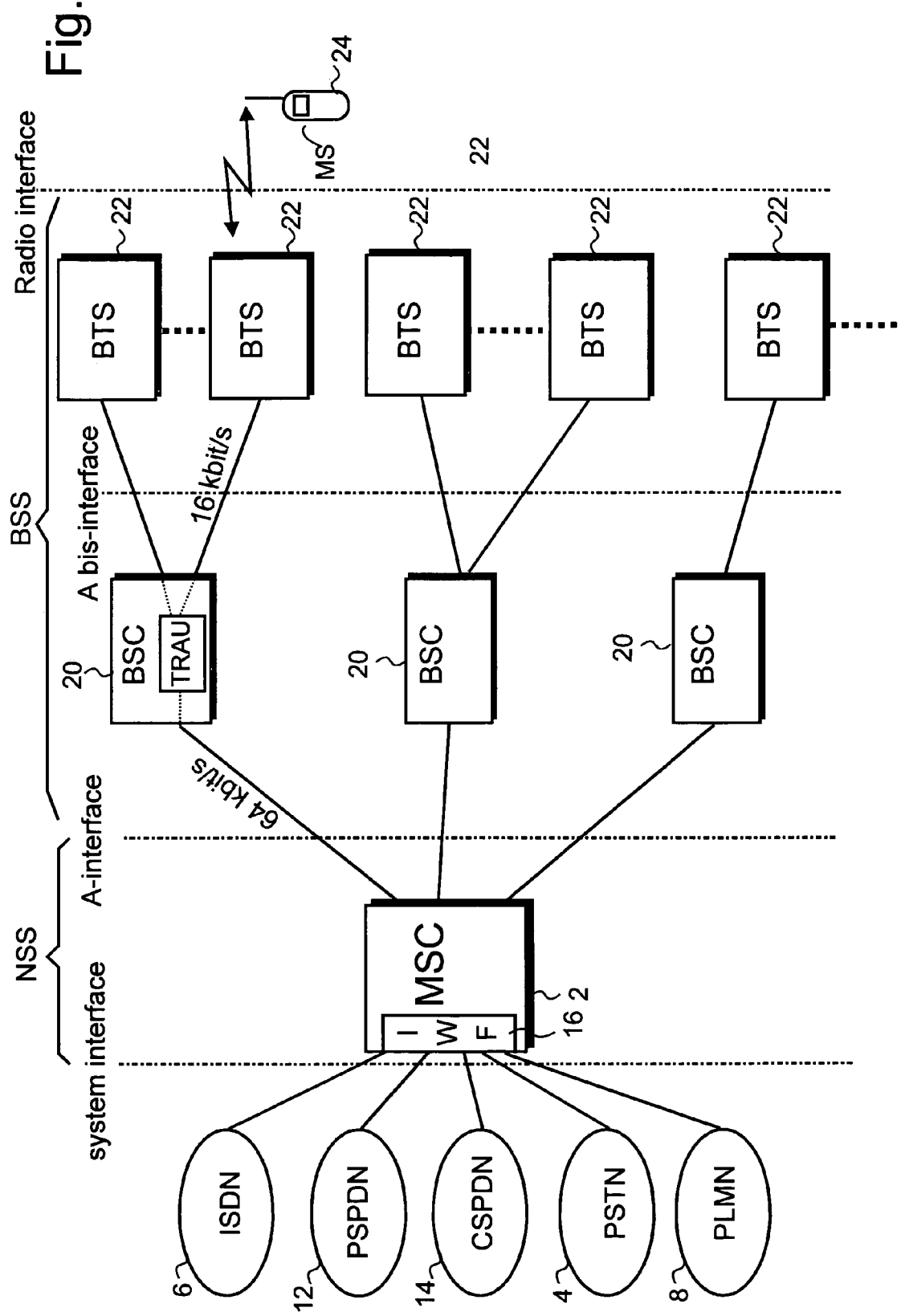
FIG. 1 shows such parts of a mobile communications network which are essential to the invention.
Figure 2A:
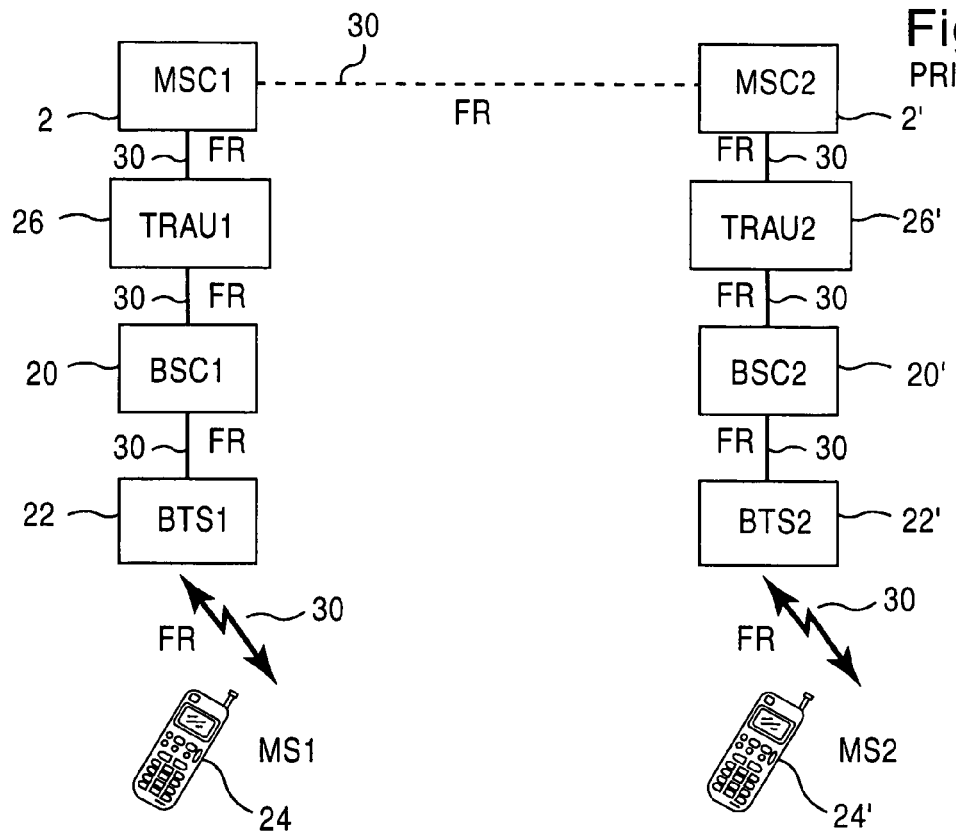
FIGS. 2a–2c show examples of state-of-the-art speech transmission situations.
Figure 2B:
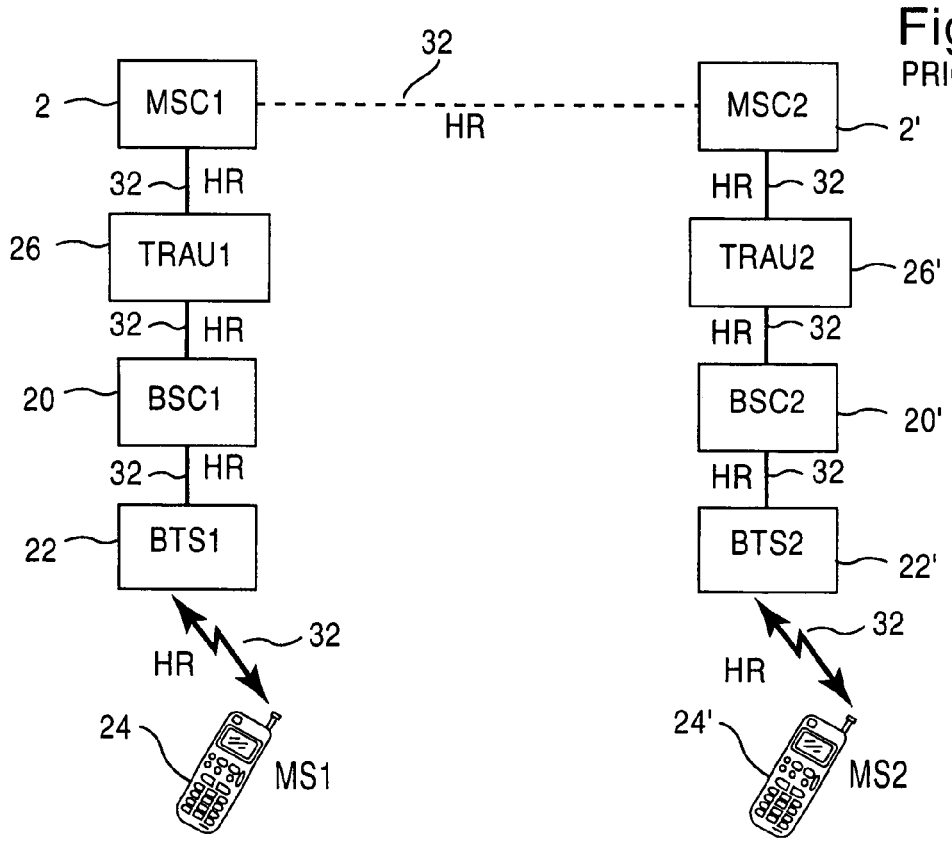
Figure 2C:
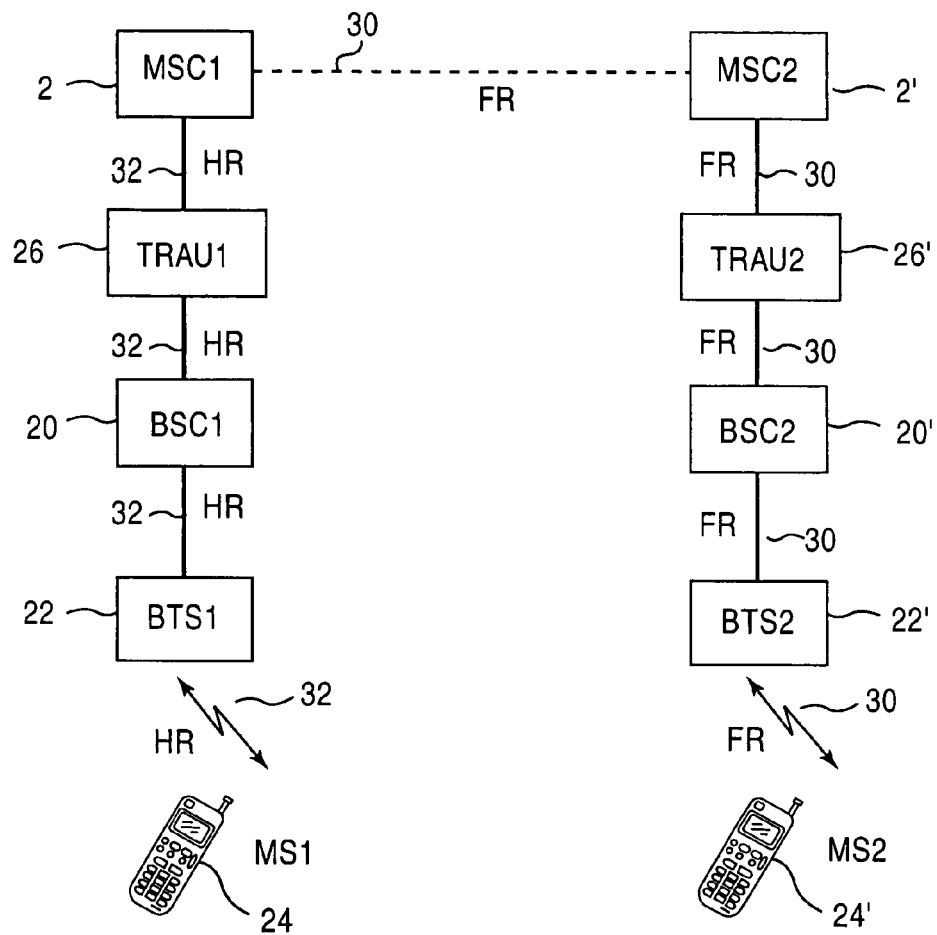

The present invention may be applied in connection with any telecommunications system. The invention will be described hereinafter by way of example and mainly in connection with a digital GSM mobile communications system. FIG. 1 shows the simplified structure of the GSM network described above. The interested reader will find background information as regards a more detailed description of the GSM system from GSM recommendations and from the book "The GSM System for mobile Communications", M. Mouly & M. Pautet, Palaiseau, France, 1992, ISBN:2 -9507190-0-7.

Figure 3:
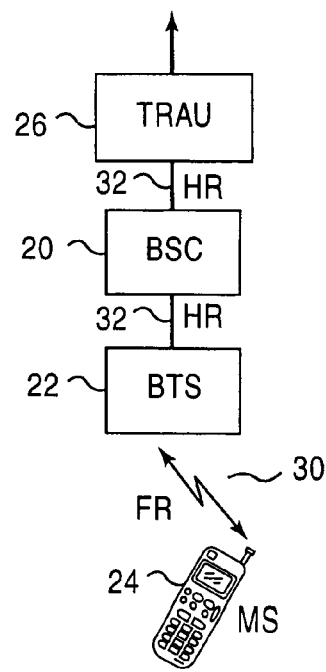
FIG. 3 is a speech transmission diagram of data transmission boosting according to the invention.

FIG. 3 shows boosting of data transmission in a mobile communications system in accordance with the invention. In the case shown as an example in FIG. 3, the mobile station MS 24 uses full rate speech coding 30. Hereby speech parameters of full rate FR 30 speech coding are transmitted between base transceiver station BTS 22 and mobile station MS 24. According to the invention, the speech parameters are converted for a transmission connection between base transceiver station BTS 22 and the network transcoder unit TRAU 26 into speech parameters of speech coding of a lower transmission rate, in the case shown in FIG. 3 into speech parameters of half rate speech coding 32. Thus, the speech parameters received from the mobile station are decoded at the end of base transceiver station BTS 22 and a new speech coding is carried out by a speech coding method of a lower transmission rate, in the case shown in FIG. 3 by half rate speech coding 32. The new speech parameters thus obtained are transmitted over the transmission connection to the transcoder unit TRAU 26. Correspondingly, the speech parameters received from transcoder unit TRAU 26 are decoded at the end of base transceiver station BTS 22 and a new speech coding is performed by a speech coding method available on the radio path, in the case shown in FIG. 3 by full rate speech coding 30. The resulting speech parameters are transmitted to mobile station MS 24 over the radio path. When required, a corresponding conversion of the speech parameters is performed at the end of transcoder unit TRAU 26 to transmit speech elsewhere in the network and from elsewhere in the network to the base transceiver station connection. From transcoder unit TRAU 26 the speech is transmitted elsewhere in the network in some state-of-the-art manner. Instead of the speech codings 30, 32 shown in FIG.

3 other speech codings may also be used, however, so that the speech coding in use in the connection between the base transceiver station 22 and the transcoder unit 26 is a speech coding of a lower transmission rate than the speech coding used on the radio path.

Figure 4A:
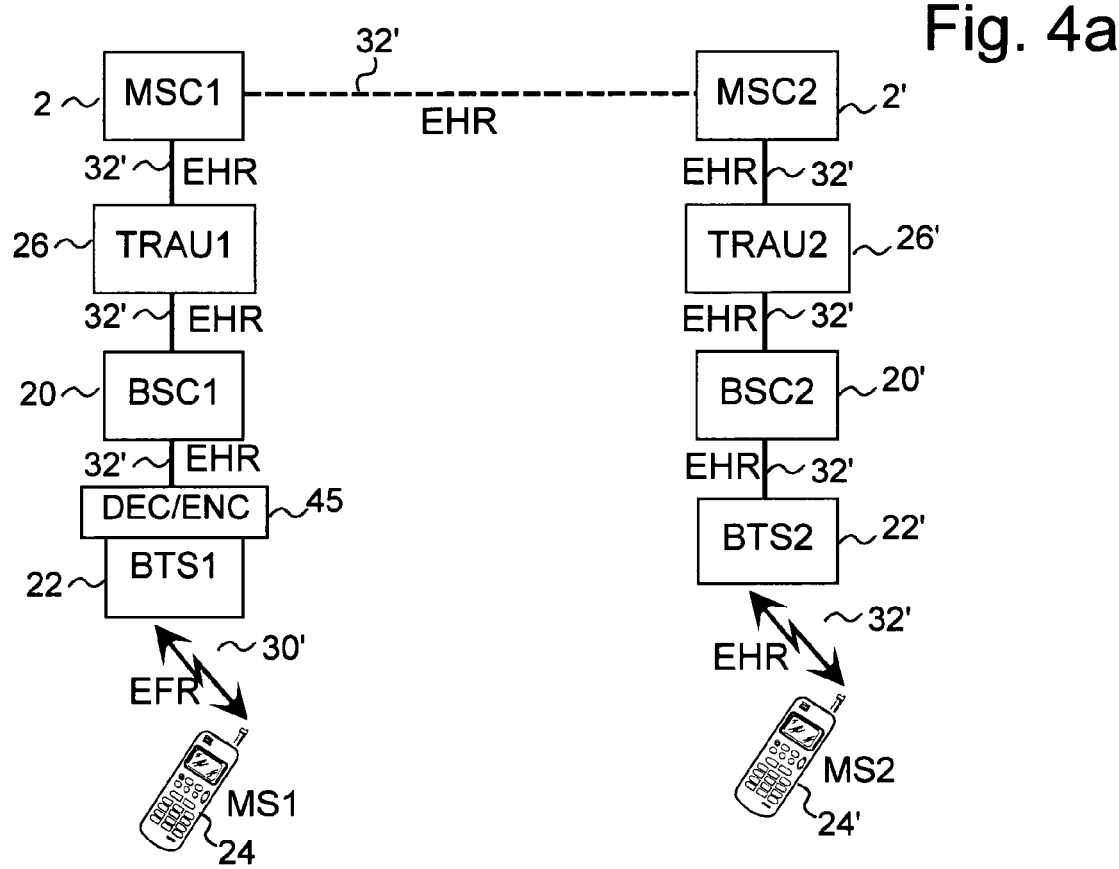
FIGS. 4a and 4b show speech transmission situations according to a first embodiment of the invention as examples.

In the following the invention will be described in greater detail in the light of a first embodiment of the invention and referring to FIGS. 4*a* and 4*b*. In the first embodiment of the invention, a speech coder 45 according to the invention is located when required in connection with base transceiver station BTS 22 to decode and recode the call to be relayed so that the speech parameters to be transmitted are converted between a first and a second speech coding method. FIG. 4*a* shows a call transmission connection between two mobile stations MS1 24 and MS2 24' as an example. Mobile station MS1 24 uses enhanced full rate speech coding EFR 30' and mobile station MS2 uses enhanced half rate speech coding EHR 32'. Base transceiver station BTS1 receives the EFR 30' speech parameters from mobile station MS1 24. The speech coder according to the invention decodes them and recodes by enhanced half rate speech coding HER 32'. These EHR 32' speech parameters are transmitted through base station controller BSC1 20 to transcoder unit TRAU1 26 and from there further by using state-of-the-art barring of tandem coding as EHR 32' speech parameters by way of exchanges MSC1 2 and MSC2 2' to transcoder unit TRAU2 26', which transmits the EHR 32' speech parameters further through base station controller BSC2 20' to base transceiver station BTS2 22'. At the end of base transceiver station BTS2 22' the EHR 32' speech parameters are transmitted over the radio path to mobile station MS2 24', where enhanced half rate speech coding EHR 32' is used. Thus, in the speech transmission described above, only one decoding and recoding of speech coding is performed on the mobile station network side. Correspondingly, the EHR 32' speech parameters received from mobile station MS2 24' are transmitted unchanged over the transmission network to the end of base transceiver station BTS1 22, where a speech coder according to the invention decodes them and carries out recoding by enhanced full rate speech coding 30'. These EFR 30' speech parameters are transmitted from base transceiver station BTS1 22 over the radio path to mobile station MS1 24.

Figure 4B:
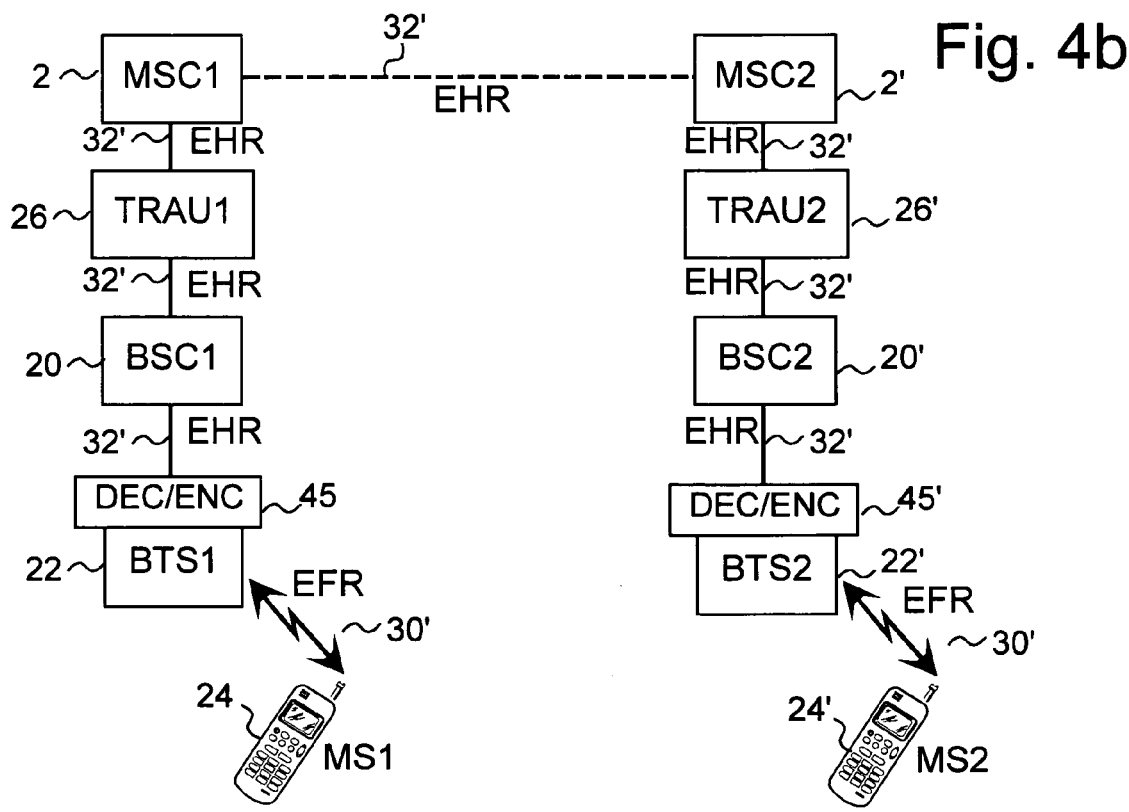

FIG. 4*b* is an example of another situation showing a call transmission connection between two mobile stations MS1 24 and MS2 24' where both mobile stations MS1 24 and MS2 24' use enhanced full rate speech coding EFR 30'. Base transceiver station BTS1 22 receives the EFR 30' speech parameters sent by mobile station MS1 24. In order to boost the data transmission on the connection between the base transceiver station and the network transcoder unit, the speech coder according to the invention decodes the speech parameters received at base transceiver station BTS1 22 and recodes the speech by enhanced half rate speech coding 32'. The resulting EHR 32' speech parameters are transmitted to transcoder unit TRAU1 26, which again transmits the EHR 32' speech parameters unchanged through exchanges MSC1 2 and MSC2 2' to transcoder unit TRAU2 26'. TRAU2 26' sends the EHR 32' speech parameters to base transceiver station BTS2 22'. Before being transmitted onto the radio path, the received EHR 32' speech parameters are decoded in a speech coder according to the invention and they are recoded by the enhanced full rate speech coding available on the radio path. The EFR 30' parameters are transmitted to mobile station MS2 24'. Correspondingly, the same procedure is used for the EFR 30' speech parameters of mobile station MS2 24' which are received at base transceiver station BTS2 22'.

FIGS. 5*a* and 5*b* show examples of situations in accordance with another embodiment of the invention. In this second embodiment of the invention a first speech coder 45 is located in connection with the base transceiver station, besides which another speech coder 55 is located in connection with transcoder TRAU 26 also to decode and recode the speech to be relayed so that the speech parameters are converted between a first and a second speech coding method. FIG. 5*a* shows a speech transmission connection between two mobile stations MS1 24 and MS2 24', when both mobile stations use enhanced full rate speech coding 30'. The EFR 30' speech parameters received by base transceiver station BTS1 22 from mobile station MS1 24 are converted in accordance with the invention into EHR 32' parameters and they are transmitted to transcoder unit TRAU1 26 in the same manner as was described above in connection with the first embodiment of the invention. The EHR 32' speech parameters received in transcoder unit TRAU1 26 are converted in a speech coder in accordance with the invention for a transmission rate of enhanced full rate speech coding. When required, the speech parameters may also be converted into PCM samples. At the transmission rate of enhanced full rate speech coding the speech is transmitted from transcoder unit TRAU1 26 through exchanges MSC1 2 and MSC2 2' to transcoder unit TRAU2 26'. The speech received in transcoder unit TRAU2 26' is converted in a speech coder 55' according to the invention back to EHR 32' speech parameters, which are transmitted to base transceiver station BTS2 22'. Before being transmitted onto the radio path, the EHR 32' speech parameters are converted in accordance with the invention into EFR 30' speech parameters, as was described above in connection with a first embodiment of the invention.

FIG. 5*b* shows an example of another situation where mobile station MS1 24 uses enhanced full rate speech coding EFR 30' and mobile station MS2 24' uses enhanced half rate speech coding EHR 32'. The EFR 30' speech parameters received at base transceiver station BTS1 22 are converted in accordance with the invention into EHR 32' speech parameters and they are transmitted to transcoder unit TRAU1 26 in the same manner as was presented above in connection with the description of FIG. 4*a*. The EHR 32' speech parameters received in transcoder unit TRAU1 26 are converted in a speech coder 55 according to the invention into a transmission rate of enhanced full rate speech coding 30'. When required, the speech parameters may also be converted into PCM samples. At the transmission rate of enhanced full rate speech coding 30' the speech is transmitted from transcoder unit TRAU1 26 through exchanges MSC1 2 and MSC2 2' to transcoder unit TRAU2 26'. The speech received in transcoder unit TRAU2 26' is again converted in a speech coder according to the invention into EHR 32' speech parameters, which are transmitted to base transceiver station BTS2 22' and from there further over the radio path to mobile station MS2 24'. The EHR 32' speech parameters received from mobile station MS2 24' are converted correspondingly in a reversed order when transmitting the speech in the network from base transceiver station BTS2 22' to base transceiver station BTS1 22.

Figure 6A:
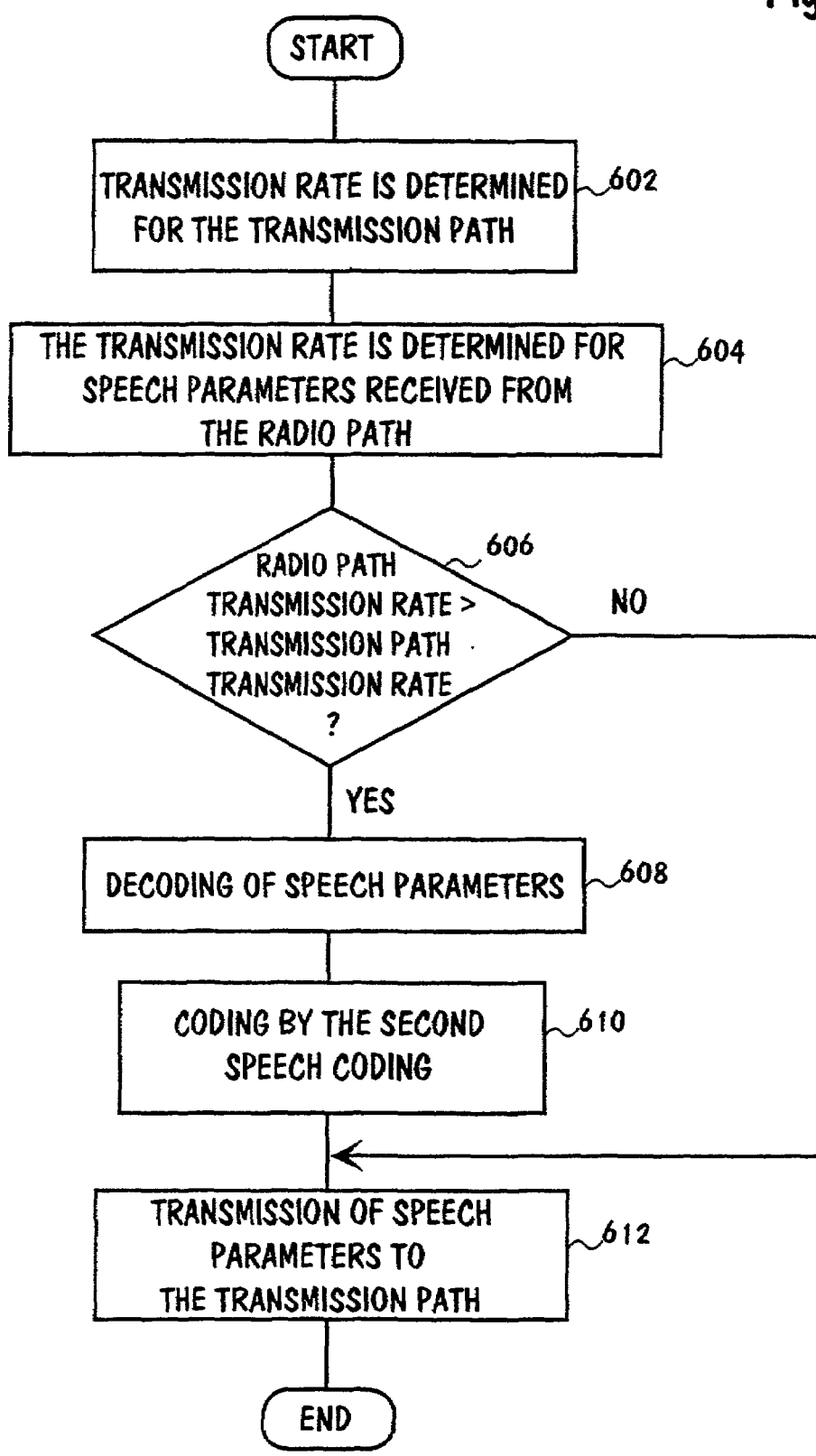
FIGS. 6a and 6b show flow charts of data transmission boosting according to the invention.

FIG. 6*a* shows boosting of data transmission in accordance with the invention in a mobile communications system in the uplink direction. At point 602 the transmission rate is determined which is to be used on the transmission path between the base transceiver station and the transcoder unit, and at point 604 the transmission rate of speech parameters received from mobile station MS at the base transceiver station is determined, that is, the transmission rate used on the radio path. At point 606 the transmission rates determined above are compared with one another. If the radio path transmission rate is higher than the transmission rate of the transmission path between the base transceiver station and the transcoder unit, the speech parameters are decoded (point 608) and they are recoded by the second speech coding, which is used on the transmission path between the base transceiver station and the transcoder unit (point 610). The speech parameters thus processed are transmitted from the base transceiver station to the transcoder unit over the transmission path (point 612). If in the check at point 606 the radio path transmission rate is not higher than the transmission rate of the transmission path, then the speech parameters are processed in a state-of-the-art manner and they are transmitted further in the network.

Figure 6B:
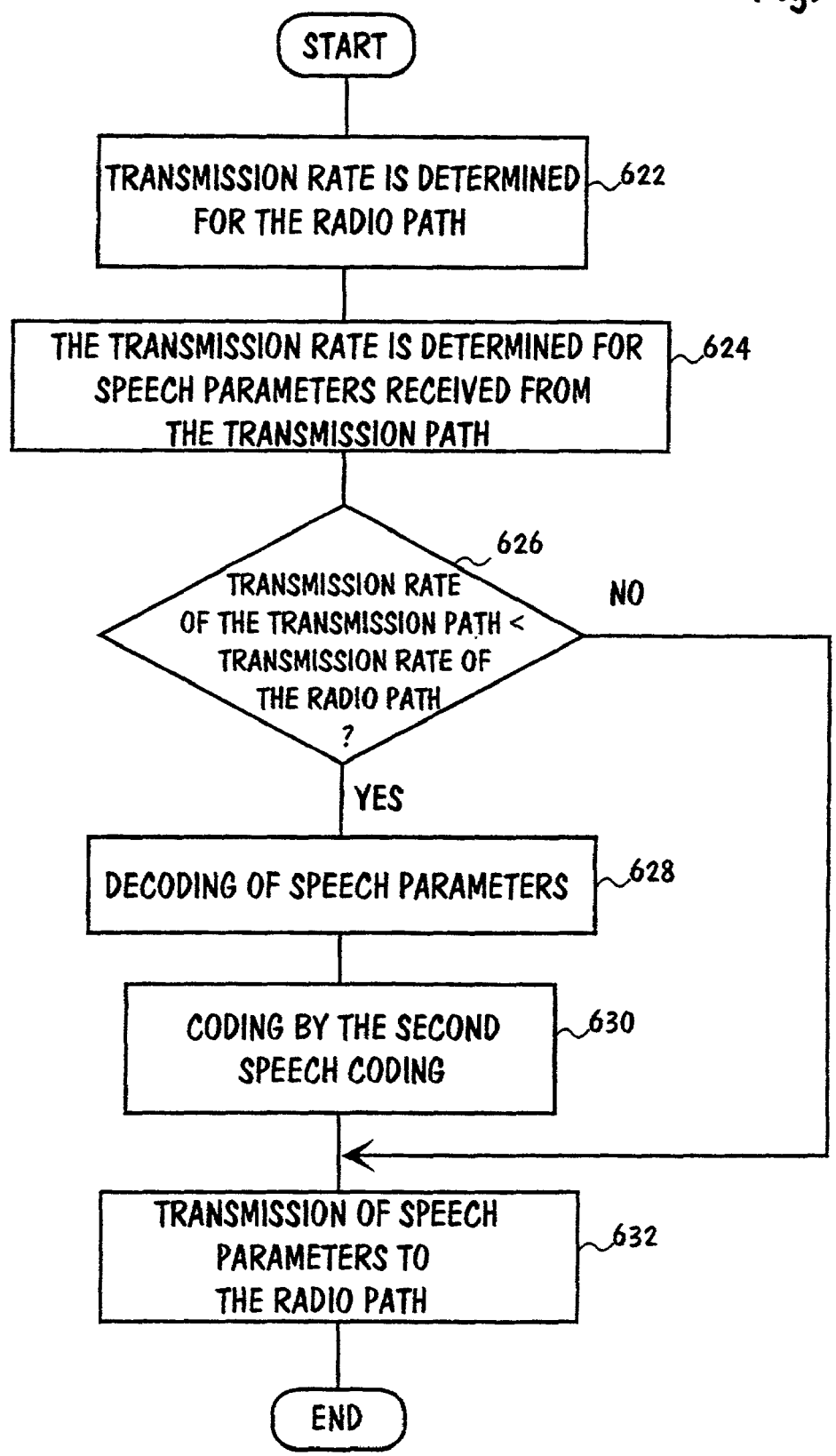

FIG. 6b shows boosting of data transmission in accordance with the invention in a mobile communications system in the downlink direction. At point 622 the transmission rate used on the radio path is determined, while at point 624 the transmission rate of speech parameters received from the transcoder unit at the base transceiver station are determined. At point 626 a comparison is made between the transmission rates determined above. If the transmission rate used on the transmission path between the base transceiver station and the transcoder unit is lower than the transmission rate of the radio path, then the received speech parameters are decoded (point 628) and they are recoded by a first speech coding, which is used on the radio path (point 630). The reprocessed speech parameters are transmitted from the base transceiver station to the mobile station over the radio path (point 632). If it is found in the check at point 626 that the transmission rate of the transmission path is not lower than the transmission rate of the radio path, then the speech parameters are transmitted to the mobile station in a state-of-the-art manner.

The speech coder in accordance with the invention supports two or more speech coding methods, which are used in a telecommunications system, preferably in a mobile communications system. The speech coder according to the invention may also be used in other situations than those shown in the preceding examples to implement the functionality according to the invention.

In mobile station MS speech coding and decoding are performed in a state-of-the-art manner, which is why it is not described in greater detail in this connection.

The drawings and the related explanation are intended only to illustrate the inventive idea. As regards its details the boosting of data transmission in accordance with the invention may vary within the scope of the claims. Even though the invention was described above mainly in connection with a mobile communications system, the boosting of data transmission may be used also for a telecommunications system of some other kind, when the telecommunications system uses a low transmission rate speech coding on the transmission path between the fixed station and the terminal equipment. Thus, in the present application a base transceiver station means any such unit in a telecommunications network which is in connection with pieces of terminal equipment, whereas a mobile station means both mobile and fixed pieces of terminal equipment which are in connection with a telecommunications network. The functionality according to the invention may be implemented in the network for all connections or for some connections only.

The invention claimed is:

1. A method for boosting data transmission in a telecommunications system, the method comprising:
    providing a first transmission path connecting terminal equipment with a fixed station;
    providing a second transmission path connecting the fixed station with a transcoder unit;
    transmitting speech parameters on the first transmission path using a first speech coding method;
    converting the speech parameters between the first speech coding method and a second speech coding method, the second speech coding method being speech coding at a lower transmission rate than the first speech coding method; and
    transmitting the speech parameters at least on a part of the second transmission path using the second speech coding method.

2. A method according to claim 1, wherein providing the first transmission path comprises providing the first transmission path over a radio path connecting a base transceiver station and a mobile station.

3. An arrangement for boosting data transmission in a telecommunications system comprising a fixed station, terminal equipment, and a transcoder unit, the arrangement comprising:
    a first transmission path connecting the terminal equipment with the fixed station configured to use a first speech coding method to transmit speech parameters;
    a second transmission path connecting the fixed station and the transcoder unit configured to use a second speech coding method to transmit the speech parameters;
    at least one first speech coder configured to convert the speech parameters between the first speech coding method and the second speech coding method, the second speech coding method being speech coding at a lower transmission rate than the first speech coding method.

4. Arrangement as defined in claim 3, wherein the first speech coder is located in connection with the fixed station.

5. Arrangement as defined in claim 3, further comprising:
    at least one second speech coder configured to convert the speech parameters between the first speech coding method and the second speech coding method; and
    a transmission path between the first speech coder and the second speech coder, said transmission path being configured to use the second speech coding method.

6. Arrangement as defined in claim 5, wherein the second speech coder is located in connection with the transcoder unit.

7. A mobile communications system comprising:
    a base transceiver station;
    a mobile station;
    a transcoder unit,
    a first transmission path connecting the mobile station with the base transceiver station, the first transmission path being configured to use a first speech coding method to transmit speech parameters; and
    at least one first speech coder configured to convert the speech parameters between the first speech coding method and a second speech coding method, wherein the second speech coding method is used to transmit the speech parameters on a transmission path between the first speech coder and the transcoder unit, the second speech coding method being speech coding of a lower transmission rate than the first speech coding method.

8. Mobile communications system as defined in claim 7, wherein the first speech coder is located in connection with the base transceiver station.

9. Mobile communications system as defined in claim 7, further comprising:
   at least one second speech coder configured to convert the speech parameters between the first speech coding method and the second speech coding method; and
   a transmission path between the first speech coder and the second speech coder, said transmission path being configured to use the second speech coding method.

10. Mobile communications system as defined in claim 9, wherein the second speech coder is located in connection with the transcoder unit.

11. A telecommunication system comprising terminal equipment connected to a network side of the telecommunications system over a first transmission path configured to transmit speech parameters using a first speech coding method, the network side comprising:
   a fixed station connected to a transcoder unit over a second transmission path configured to transmit the speech parameters using a second speech coding method; and
   a speech coder configured to receive the speech parameters from the terminal equipment and to convert the speech parameters into the speech parameters of the second speech coding method, or to receive the speech parameters to be transmitted to the terminal equipment and to convert the speech parameters into the speech parameters of the first speech coding method, wherein the second speech coding method is speech coding of a lower transmission rate that the first speech coding method.

12. A fixed station for a telecommunication system, the telecommunication system comprising a terminal equipment, wherein the terminal equipment is connected to the fixed station over a first transmission path configured to transmit speech parameters using a first speech coding method, wherein the fixed station is connected to a transcoder unit over a second transmission path configured to transmit the speech parameters using a second speech coding method, wherein the second speech coding method is speech coding of a lower transmission rate than the first speech coding method.

13. A speech coder for a telecommunication system, the telecommunication system comprising a terminal equipment connected to a network side of the telecommunication system over a first transmission path configured to transmit speech parameters using a first speech coding method, wherein the speech coder is configured to receive the speech parameter from the terminal equipment and to convert the speech parameters into the speech parameters of a second speech coding method, or to receive the speech parameters to be transmitted to the terminal equipment and to convert the speech parameters into the speech parameters of the first speech coding method, wherein the second speech coding method is speech coding of a lower transmission rate than the first speech coding method.

* * * * *